United States Patent [19]
Suzuki

[11] Patent Number: 5,335,114
[45] Date of Patent: Aug. 2, 1994

[54] OPTICAL REFLECTING UNIT

[75] Inventor: Kazuhiro Suzuki, Hadano, Japan

[73] Assignee: Stanley Electric Co., Ltd., Tokyo, Japan

[21] Appl. No.: 950,242

[22] Filed: Sep. 24, 1992

[30] Foreign Application Priority Data

Sep. 25, 1991 [JP] Japan .................. 3-85357[U]

[51] Int. Cl.⁵ .................. G02B 17/00; G02B 27/10; G02B 5/08
[52] U.S. Cl. .................. 359/602; 359/614; 359/629; 359/839
[58] Field of Search .................. 359/618, 629, 839, 894, 359/896, 599, 615, 634, 638, 871, 831, 833, 601, 602, 614, 222, 583, 892; 248/466, 469, 475.1

[56] References Cited

U.S. PATENT DOCUMENTS

| | | | |
|---|---|---|---|
| 2,956,476 | 10/1960 | Rupert | 248/466 |
| 3,984,157 | 10/1976 | Le Vantine | 359/614 |
| 4,968,139 | 11/1990 | Willing | 359/896 |
| 5,011,265 | 4/1991 | Tamamura et al. | 359/629 |

FOREIGN PATENT DOCUMENTS

| | | | |
|---|---|---|---|
| 2725107 | 12/1978 | Fed. Rep. of Germany | 359/614 |
| 1147083 | 4/1969 | United Kingdom | 359/583 |

*Primary Examiner*—Loha Ben
*Assistant Examiner*—John Juba, Jr.
*Attorney, Agent, or Firm*—Fish & Richardson

[57] ABSTRACT

An optical reflecting unit comprises a support prism extending in an elongated manner, and a half mirror fixedly mounted in contact with a surface of the support prism. An optical axis of the incident light in the form of a line incident upon a half mirror is folded. A transmitted light transmitted through the half mirror is incident upon the support prism. An extracted bore is provided in which an incident transmitted light is irregularly reflected by a bottom and a peripheral wall of the extracted bore. With the arrangement discussed above, the transmitted light transmitted through the half mirror and reflected by the surface of the half-mirror support prism is not deviated in a direction along the optical axis of the reflected light from the half mirror. Only the reflected light from the half mirror can be led to a predetermined direction.

8 Claims, 5 Drawing Sheets

PRIOR ART

OPTICAL REFLECTING UNIT

BACKGROUND OF THE INVENTION

1. Field of the Invention

The present invention relates to an optical reflecting unit which is used in an image processing apparatus such as a scanner for reading a large copy or a large manuscript, and which is provided with a half mirror for leading a reflected light in the form of a line from the manuscript to a light receiving portion.

2. Prior Art of the Invention

Conventionally, in an image processing apparatus such as a scanner for reading a large manuscript, a light is irradiated to the manuscript, and a reflected light of one line extending perpendicularly to a running direction of the manuscript is read at once. The statement contents of the entire manuscript are optically read by reading per one line and by running of the manuscript.

In this case, the reflected light from the manuscript is led to a predetermined location such as a light receiving portion or the like. However, such optical system For leading the reflected light to a predetermined direction is provided with an optical reflecting unit having a half mirror.

FIG. 10 of the attached drawings is a cross-sectional view showing an arrangement of such conventional optical reflecting unit. As shown in FIG. 10, an optical reflecting unit 1 of this example comprises a support table 2 in the form of a triangular column extending in an elongated manner, and a half mirror 3 arranged on the support table 2 and fixedly arranged along a longitudinal direction on a slanting surface 2a having an inclination of, for example, 45 degrees.

With the above-described arrangement of the conventional example, an incident light A in the form of a line incident from the above in FIG. 10 is incident upon substantially a center of the half mirror 3 with respect to a width direction.

The incident light A is reflected by a surface of the half mirror 3, and a reflected light B thereof is incident upon a light receiving portion of a light receiving unit 4 that is a line sensor. The reflected light B is electrically transferred by the light receiving unit 4 to detect the incident light A.

For the optical reflecting unit 1 of the conventional example, however, the incident light A in the form of a line incident from the above has a part thereof which is reflected from the surface of the half mirror 3 and which is formed into the reflected light B. However, the remaining part of the incident light A is transmitted through the half mirror 3, and a transmitted light C thereof is incident upon the slanting surface 2a of the support table 2.

The slanting surface 2a of the support table 2 is formed into a planar surface so as to be able to securing or ensuring that the half mirror 3 is fixedly supported. For this reason, the transmitted light C incident upon the slanting surface 2a of the support table 2 has a part thereof which is reflected from the slanting surface 2a and which is again incident upon the half mirror 3. The incident transmitted light C exits the surface of the half mirror 3. The exiting transmitted light C is incident upon the light receiving unit 4 together with the reflected light B.

Accordingly, the following problem arises. That is, in the light receiving unit 4, a photoelectric transferred signal of the transmitted light C that is a disturbance light is overlapped with a detecting signal of the reflected light B to be detected originally. Thus, it is difficult to detect the incident lightA that is an object. Particularly, in a case where a level of the reflected light B is low, a signal/noise (S/N) ratio between the detecting signal of the reflected light B and the photoelectric transferring signal (noise) of the transmitted light C is deteriorated so that the subsequent signal processing becomes difficult.

SUMMARY OF THE INVENTION

In view of the above circumstances, it is an object of the invention to provide an optical reflecting unit in which a transmitted light transmitted through a half mirror and reflected from a surface of a half-mirror support table is not deviated into an optical-axis direction of the reflected light from the half mirror so that only the reflected light from the half mirror can be led to a predetermined direction.

In order to achieve the above-described object, an optical reflecting unit according to the invention comprises a support table extending in an elongated manner, and a half mirror fixedly mounted contact with a surface of the support table, for Flexing an optical axis of an incident light in the form of a line incident upon the half mirror, wherein a transmitted light transmitted through the half mirror is incident upon the support table, and an extracted bore is provided in which an incident transmitted light is irregularly reflected by a bottom and a peripheral wall of the extracted bore.

Secondly, the invention is arranged such that an optical absorber for absorbing the transmitted light transmitted through the half mirror is provided on the bottom and the peripheral wall of the extracted bore. Preferably, a blackbody is used as the optical absorber absorbing the transmitted light, and a black paint is used as the blackbody.

Thirdly, an irregular element for irregularly reflecting the transmitted light transmitted through the half mirror and for attenuating the same is provided on the bottom and the peripheral wall of the extracted bore. Preferably, a delustering paint is used as the irregular element.

Fourthly, an optical reflecting unit according to the invention comprises a support table extending in an elongated manner, and a half mirror fixedly mounted in contact with a surface of the support table, an incident light having an optical axis thereof in the form of a line incident upon the half mirror, the optical axis being flexed, wherein a through bore through which a transmitted light transmitted through the half mirror exits the support table is provided in the support table.

Fifthly, an optical reflecting apparatus comprises a support table extending in an elongated manner, and a half mirror fixed in contact with a surface of the support table, an incident light having an optical axis thereof in the form of a line incident upon the half mirror, the optical axis being flexed, wherein a transmitted light transmitted through the half mirror is incident upon the support table, an extracted bore upon which an incident transmitted light is incident is provided, a mirror for reflecting the transmitted light is arranged within the extracted bore, and a through bore is provided for exiting a transmitted light reflected by the mirror to the outside of the support table.

With the above arrangement of the invention, in the optical reflecting unit according to the invention, a part of the incident light is transmitted through the half mirror, and the transmitted light is diffusedly or irregularly reflected by the peripheral wall of the extracted bore, by a blackbody provided on the peripheral wall or by an irregular element and is damped or attenuated. Further, the transmitted light passes through the through bore and exits the support table. Alternatively, the transmitted light is reflected by the mirror which is provided at the bottom of the extracted bore, and the transmitted light exits the support table which is different from a direction toward the half mirror, from the through bore. Thus, the transmitted light is transmitted through the half mirror, and the transmitted light reflected from the surface of the half mirror support table is not deviated to the optical-axis direction of the reflected light from the half mirror. Thus, it is possible to lead only the reflected light from the half mirror in a predetermined direction.

Accordingly, it can be secured to detect the incident light A that is an object, without the fact that the photoelectric transferring signal of the transmitted light that is the disturbance light is overlapped with a detecting signal of the reflected light that is to be detected originally. Particularly, even in a case where the reflected light is low in level, a signal/noise (S/N) ratio between the detecting signal of the reflected light that is a disturbance light and the photoelectric transferring signal (noise) of the transmitted light is not deteriorated so that the subsequent signal processing is facilitated.

DETAILED DESCRIPTION OF THE PREFERRED EMBODIMENTS

Various embodiments of an optical reflecting unit according to the invention will next be described in detail with reference to the accompanying drawings.

A first embodiment of the invention will first be described.

Figure 1:
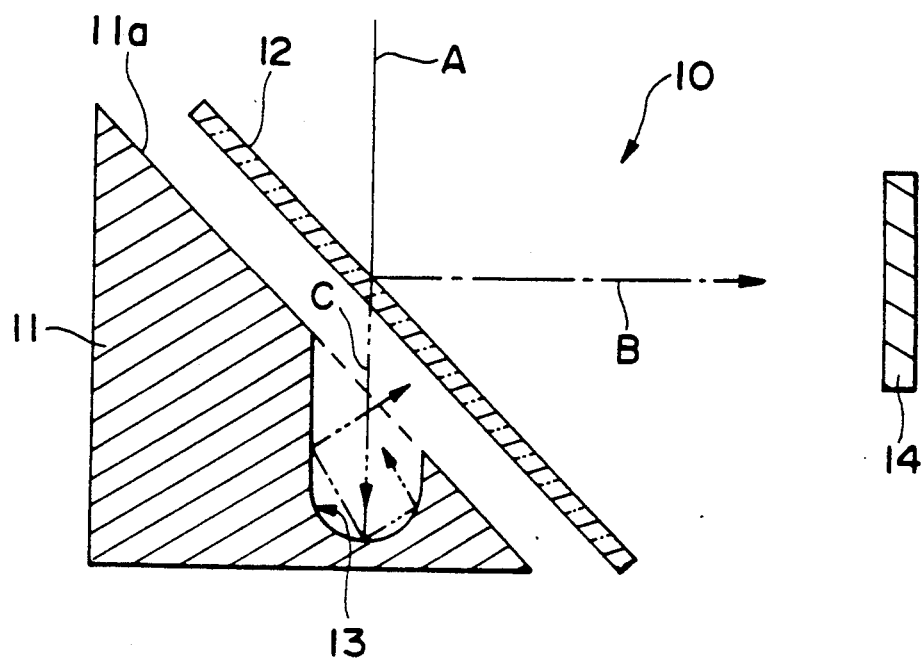
FIG. 1 is a cross-sectional view showing an arrangement of a first embodiment of an optical reflecting unit according to the invention, which is provided with an extracted bore.
Figure 2:
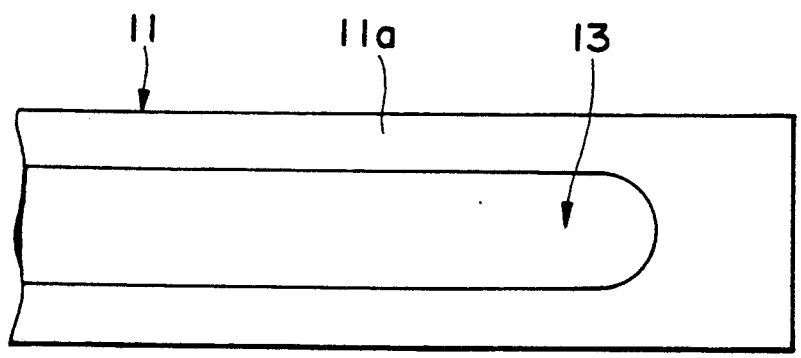
FIG. 2 is a partial top plan view of a support table shown in FIG. 1.

As shown in FIGS. 1 and 2, an optical reflecting unit 10 comprises a support table 11 of a triangular column extending in an elongated manner, and a half mirror 12 provided on the support table 11 and fixedly arranged along a longitudinal direction on a slanting surface 11a inclined, for example, 45 degrees. In this connection, in the following drawings, the slanting surface 11a of the support table 11 and the half mirror 12 are so illustrated as to be spaced from each other.

The slanting surface 11a of the support table 11 is provided with an extracted bore 13 at a location through and upon which an incident light A with respect to the half mirror 12 arranged on the slanting surface 11a passes and is incident.

Function and operation of the arrangement according to the embodiment will next be described.

The incident light A in the form of a line incident from the above in FIG. 1 is incident upon a substantial center of the half mirror 12 in a widthwise direction.

A part of the incident light A is reflected from the surface of the half mirror 12, and a reflected light B thereof is incident upon a light receiving portion of a light receiving unit 14 that is a line sensor. The reflected light B is photoelectrically transformed by the light receiving unit 14 to execute detection of the incident light A.

Further, the remaining part of the incident light A is transmitted through the half mirror 12, and a transmitted light C is incident upon a location within the extracted bore 13 in the slanting surface 11a of the support table 11.

The transmitted light C is reflected from a bottom surface of the extracted bore 13, and is further reflected again by a peripheral wall of the extracted bore 13. That is, the transmitted light C is irregularly reflected and is damped or attenuated. For this reason, the transmitted light C exiting the extracted bore 13 is attenuated in level. Moreover, the transmitted light C is irregularly reflected. For this reason, the transmitting light C does not advance or move along an optical axis to the light receiving unit 14, and is not incident upon the light receiving portion of the light receiving unit 14. Accordingly, in the light receiving unit 14, a photoelectrically transferred signal of the transmitted light C that is a disturbance light is not overlapped with a detecting signal of the reflected light B that is detected originally. Thus, it is possible to secure that the incident light A that is an object is detected.

Particularly, even in a case where the level of the reflected light B is low, a signal/noise (S/N) ratio between the detecting signal of the reflected light B that is a disturbance signal and the photoelectric transferring signal (noise) of the transmitted light C is not deteriorated so that the subsequent signal processing is facilitated.

A second embodiment of the invention will next be described.

Figure 3:
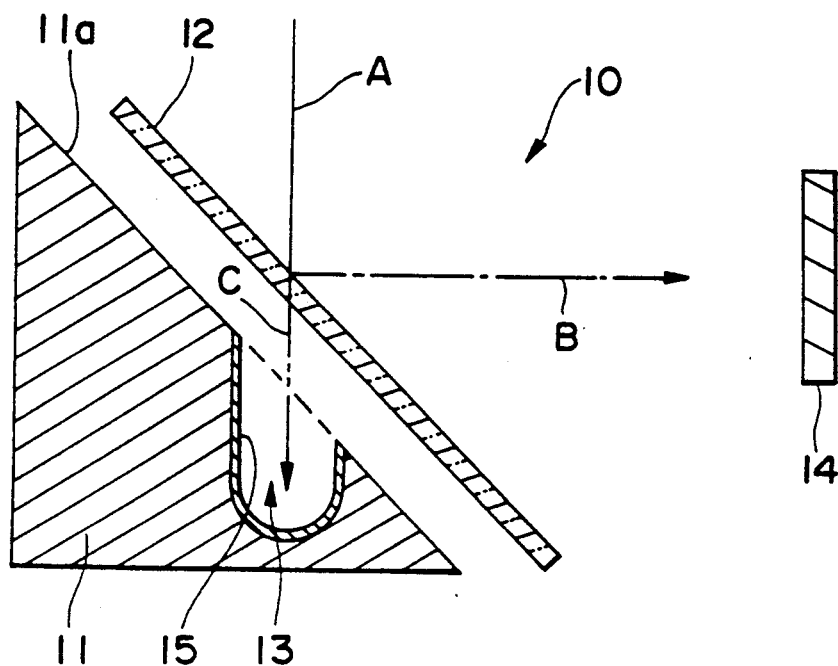
FIG. 3 is a cross-sectional view showing an arrangement of a second embodiment of the invention, which is provided with an optical absorber in an extracted bore.
Figure 4:
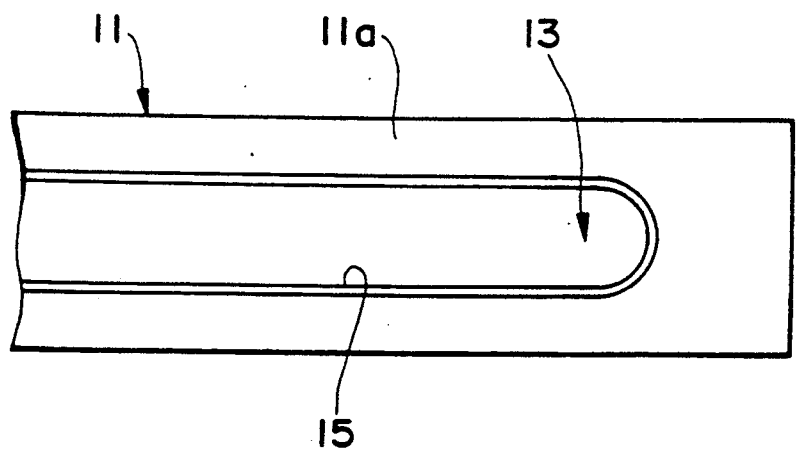
FIG. 4 is a partial top plan view showing a support table illustrated in FIG. 3.

As shown in FIGS. 3 and 4, this example is arranged such that an optical absorber 15 absorbing a transmitted light C, for example, a black paint serving as a blackbody is applied to the peripheral wall of the substantially U-shaped extracted bore 13 in the support table 11 illustrated in FIG. 1.

By the optical absorber 15, a part of an incident light A is transmitted through a half mirror 12, and the transmitted light C thereof is absorbed and does not exit from the extracted bore 13.

A third embodiment of the invention will next be described.

Figure 5:
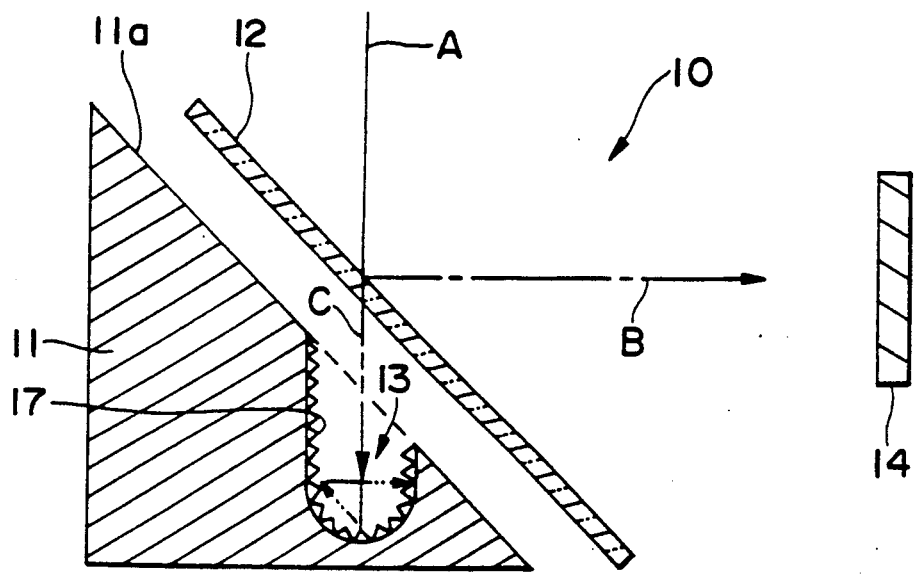
FIG. 5 is a cross-sectional view showing an arrangement of a third embodiment of the invention, which is provided with an irregular element in an extracted bore.
Figure 6:
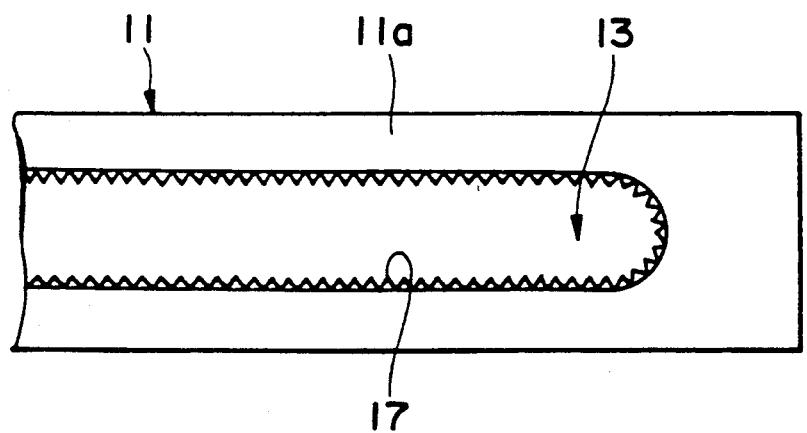
FIG. 6 is a partial top plan view showing a support table illustrated in FIG. 5.

As shown in FIGS. 5 and 6, this example is arranged such that an irregular element 17 for irregularly reflecting a transmitted light C, for example, a mat or delustering paint is applied to the peripheral wall of the substantially U-shaped extracted bore 13 in the support table 11 illustrated in FIG. 1.

The transmitted light C in which a part of an incident light A is transmitted through a half mirror 12 is irregularly reflected by the irregular element 17 in the extracted bore 13, and is attenuated.

A fourth embodiment of the invention will next be described.

Figure 7:
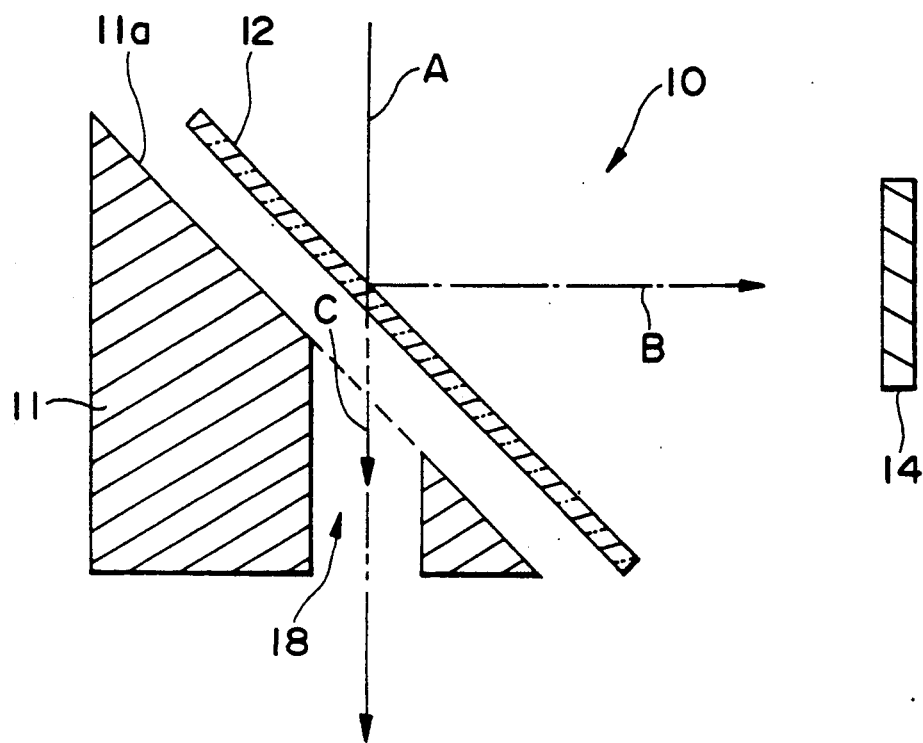
FIG. 7 is a cross-sectional view showing an arrangement of a fourth embodiment of the invention, which is provided with a through bore.

As shown in FIG. 7, this example is arranged such that a through bore 18 is provided in which the substantially U-shaped extracted bore 13 in the support table 11 illustrated in FIG. 1 penetrates or extends. By this through bore 18, a part of an incident light A is transmitted through a half mirror 12. A transmitted light C thereof passes through the through bore 18, and does not exit toward a direction of the half mirror 12.

Thus, the transmitted light C exiting from the extracted bore 13 does not advance or move along an optical axis to a light receiving unit 14, and is not incident upon a light receiving portion of the light receiving unit 14.

A fifth embodiment of the invention will next be described.

Figure 8:
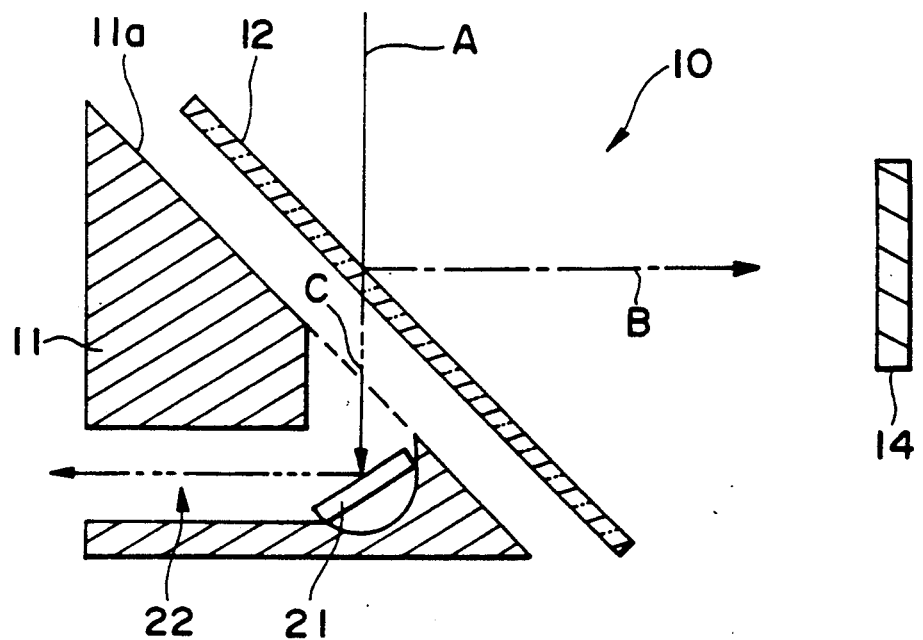
FIG. 8 is a cross-sectional view showing an arrangement of a fifth embodiment of the invention, which is provided with a reflecting mirror and a through bore.
Figure 9:
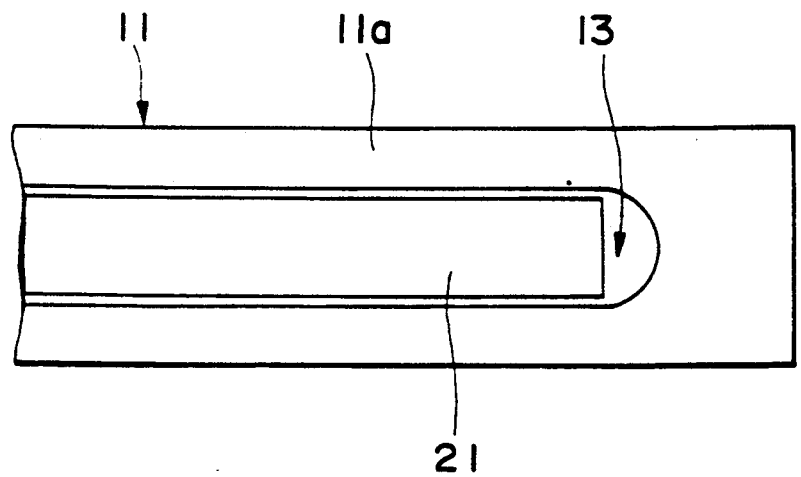
FIG. 9 is a partial top plan view showing a support table illustrated in FIG. 8.
Figure 10:
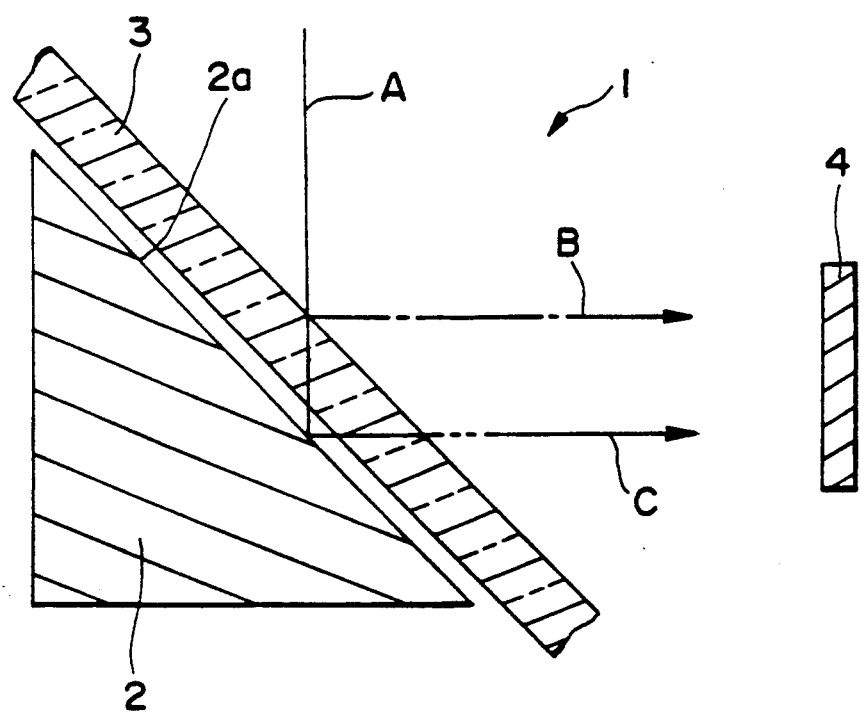
FIG. 10 is a schematic cross-sectional view showing an arrangement of an optical reflecting unit of a conventional example.

As shown in FIGS. 8 and 9, this example is arranged such that a mirror 21 is provided in which a part of an incident light A is reflected at the bottom of the substantially U-shaped extracted bore 13 in the support table 11 illustrated in FIG. 1 perpendicularly to a transmitted light C which is transmitted through a half mirror 12. Moreover, a through bore 22 through which the transmitted light C reflected by the mirror 21 is outgone to the outside of a support table 11.

The transmitted light C reflected from the mirror 21 exits from the support table 11 through the through bore 22 in a direction different from a direction of the half mirror 12 and different from a direction toward a light receiving portion of a light receiving unit 14.

In this manner, according to the invention, the transmitted light in which a part of the incident light is transmitted through the half mirror is irregularly reflected by the peripheral wall of the extracted bore, by the blackbody provided on the peripheral wall or by the irregular element, and is attenuated. Moreover, the transmitted light exits the support table, through the through bore. Furthermore, the transmitted light is reflected by the mirror which is provided at the bottom of the extracted bore, and exits the support table through the through bore, which is different from the direction of the half mirror.

For the reason discussed above, there is produced the following advantage. That is, the transmitted light transmitted through the half mirror and reflected by the surface of the half-mirror support table is not deviated in the optical-axis direction of the reflected light from the half mirror. Thus, it is possible to lead only the reflected light from the half mirror, in a predetermined direction.

In addition, the photoelectric transferring signal of the transmitted light is not overlapped with the detecting signal of the reflected light to be detected originally by the disturbance light so that it is possible to ensure to detect the incident light that is an object. Particularly, even in a case where the reflected light is low in level, a signal/noise (S/N) ratio between the detecting signal of the reflected light that is a disturbance light and the photoelectric transferring signal (noise) of the transmitted light is not deteriorated so that the subsequent signal processing can be facilitated.

What is claimed is:

1. An optical reflecting unit comprising:
 a prism having a slanting surface, said slanting surface having a longitudinal direction;
 a half mirror for folding the optical path of light which is incident upon said half mirror in the form of a scan line, and for transmitting a portion of said incident light as a transmitted light, said half mirror arranged relative to the slanting surface along the longitudinal direction;
 an extracted bore in said prism for receiving said transmitted light; and
 an optical absorber, provided on a bottom and a peripheral wall of the extracted bore, for absorbing the transmitted light through said half mirror.

2. An optical reflecting unit according to claim 1, wherein a blackbody is used as the optical absorber light.

3. An optical reflecting unit according to claim 2, wherein a black paint is used as said blackbody.

4. An optical reflecting unit comprising:
 a prism having a slanting surface, said slanting surface having a longitudinal direction;
 a half mirror for folding the optical path of light which is incident upon said half mirror in the form of a scan line, and for transmitting a portion of said incident light as a transmitted light, said half mirror arranged relative to the slanting surface along the longitudinal direction;
 an extracted bore in said prism for receiving said transmitted light, said extracted bore having a surface condition wherein said transmitted light is irregularly reflected by a bottom and a peripheral wall of said extracted bore; and
 an irregular element, provided on the bottom and the peripheral wall of said extracted bore, for irregularly reflecting the transmitted light transmitted through said half mirror and for attenuating said transmitted light.

5. An optical reflecting unit according to claim 4, wherein a delustering paint is used as the irregular element.

6. An optical reflecting unit comprising:
 a prism having a slanting surface, said slanting surface having a longitudinal direction;
 a half mirror for folding the optical path of light which is incident upon said half mirror in the form of a scan line, and for transmitting a portion of said incident light as a transmitted light, said half mirror arranged relative to the slanting surface along the longitudinal direction; and
 a through bore in said prism for receiving said transmitted light and for passing said received transmitted light outside of said prism.

7. An optical reflecting unit comprising:
 a prism having a slanting surface, said slanting surface having a longitudinal direction;
 a half mirror for folding the optical path of light which is incident upon said half mirror in the form of a scan line, and for transmitting a portion of said incident light as a transmitted light, said half mirror arranged relative to the slanting surface along the longitudinal direction;

an extracted bore in said prism for receiving said transmitted light;

a mirror within the extracted bore for reflecting said transmitted light; and a through bore for conveying said transmitted light reflected by said mirror within the extracted bore outside of said prism.

8. An optical reflecting unit comprising:

a prism having a slanting surface, said slanting surface having a longitudinal direction;

a half mirror for folding the optical path of light which is incident upon said half mirror in the form of a scan line, and for transmitting a portion of said incident light as a transmitted light, and for reflecting a portion of said incident light to a light receiving means, said mirror arranged relative to the slanting surface along the longitudinal direction; and an extracted bore in said prism for receiving light transmitted through said half mirror and having a shape which substantially prevents reflection of said transmitted light to said light receiving means.

* * * * *